J. GOODALE.
Pendulum Weighing-Scale.

No. 225,008.      Patented Mar. 2, 1880.

Witnesses.
Oscar C. Greene
Willis Rogers

Inventor.
John Goodale
by J. H. Adams
Atty

UNITED STATES PATENT OFFICE.

JOHN GOODALE, OF CAMBRIDGE, MASSACHUSETTS, ASSIGNOR TO EBENEZER B. WELCH, OF SAME PLACE.

PENDULUM WEIGHING-SCALE.

SPECIFICATION forming part of Letters Patent No. 225,008, dated March 2, 1880.

Application filed September 22, 1879.

*To all whom it may concern:*

Be it known that I, JOHN GOODALE, of Cambridge, in the county of Middlesex and State of Massachusetts, have invented a new and useful Improvement in Weighing-Scales, of which the following is a specification.

My invention relates to that class of weighing-scales in which a dial and index-finger are used to indicate the weight of articles; and the invention consists in operating the index-finger that traverses the dial by means of a rack-bar actuated by an arm connected with the rock-shaft that carries a weighted rod.

Figure 1:
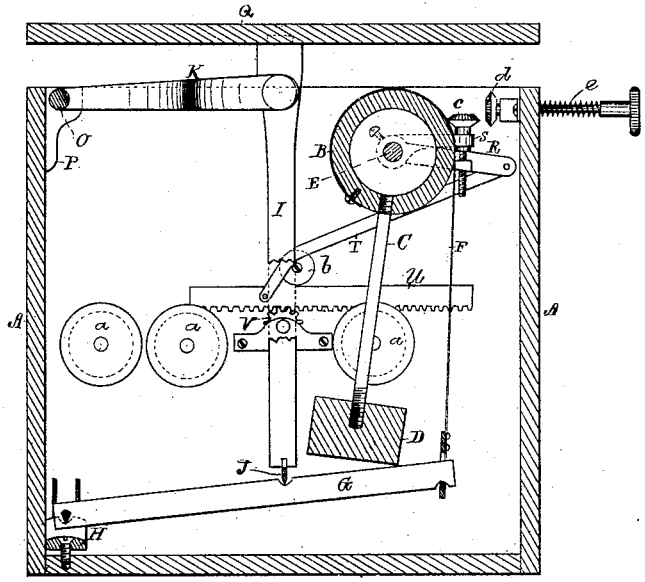
Figure 2:
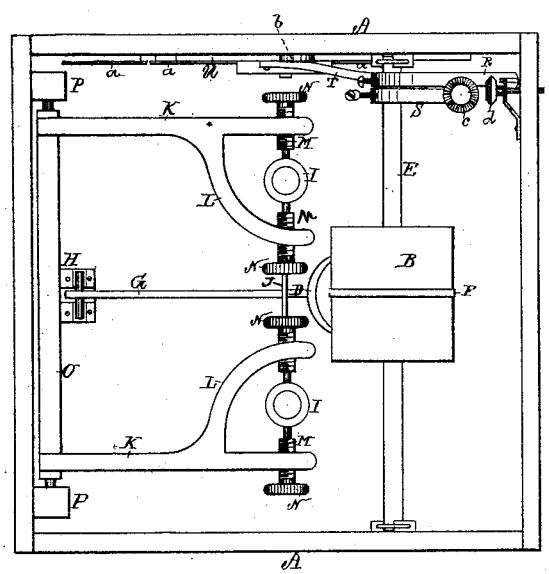
Figure 3:
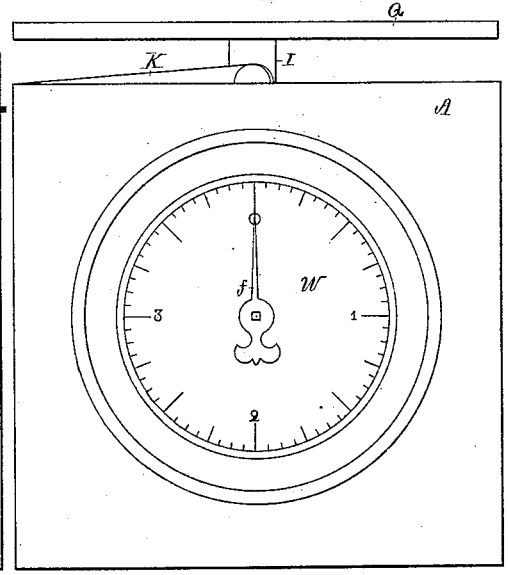

Referring to the drawings, Figure 1 represents a vertical section of a scale embodying my invention. Fig. 2 is a top view with the platform removed. Fig. 3 is a front view, showing the dial and index-finger.

A is the casing or frame that contains the scale. B is a drum, attached to a rock-shaft, E, mounted in the upper part of the casing A. To the drum B is secured a rod, C, to the lower end of which is attached a weight or counterpoise, D.

Attached to the drum B, and nearly surrounding the same, is a thin steel band, F, which extends downward, and is connected to a lever, G, pivoted in a block, H, on the bottom of the casing or frame.

Upon the lever G rests a bar, J, which supports two uprights, I I, having upon their upper ends the platform Q.

To the upper part of the casing is pivoted a bar, O, in brackets or supports P P, to which bar are attached the arms K K, forming a yoke, with the supplemental arms L L, as shown in Fig. 2. Through the ends of the arms K L pass screws M, having sharp-pointed ends that form pivots for the uprights I I, so as to admit of their moving upon the said pivots or points with the least possible friction. The screws M are provided with thumb-pieces N, as shown.

Near one end of the shaft E is attached a bar, R, arranged at right angles with the weighted rod C.

To the free end of the bar R is pivoted a connecting-rod, T, connected at its other end to bar U, provided with teeth on its under side that engage with a pinion, V, on an arbor that passes through the dial W, and bears upon its outer end the indicator *f*, Fig. 3. *a a a* are friction-rollers supporting the ratchet-bar U. Above the bar U is a roller, *b*, which serves to keep the ratchet-bar in gear with the pinion V.

To the shaft E, near the bar R, is secured an arm, S, serving as a counterpoise to the arm R; and to the arm S is attached a small shaft carrying a bevel-gear, which is caused to engage with a bevel-gear, *d*, attached to a spring-rod, *e*, the object of which is to turn the shaft E and set the indicator-hand *f*.

By arranging the arm R at right angles with the weighted rod C the necessary relation between the movement of the said rod and that of the rack-bar that operates the indicator will be so proportioned as to cause the indicator to register pounds and fractions of a pound evenly distributed on a circular dial.

When the weight is greater than can be registered by a single revolution of the index-hand the latter will traverse the dial two or more times to indicate the additional weight.

Operation: The article to be weighed is placed upon the platform Q, causing the lever G to be depressed and drawing down the band F, which effects the rotation of the drum B and shaft E. The arm R is consequently depressed and causes the longitudinal movement of the ratchet-bar U, and thus effecting the rotation of the pinion V and consequent movement of the indicator *f*.

It is understood that the several bearing-points are to consist of knife-edges or pointed pivots, so as to insure the least possible friction in those parts.

What I claim as my invention, and desire to secure by Letters Patent, is—

1. The combination, with a shaft or drum provided with a weighted rod, of an arm attached to said shaft, and arranged at right angles with the said weighted rod, and connected with a rack-bar that actuates a pinion by which the indicator-hand is operated, substantially as and for the purpose set forth.

2. The combination of the drum or shaft having a weight-rod, the arm R, connecting-rod T, ratchet-bar U, and pinion V, that actuates the indicator *f*, substantially as set forth.

In testimony whereof I have signed my name to this specification in the presence of two subscribing witnesses.

JOHN GOODALE.

Witnesses:
J. H. ADAMS,
WILLIE ROGERS.